United States Patent [19]
Reip

[11] 4,116,062
[45] Sep. 26, 1978

[54] REMOVABLE TANK GAUGE FLOAT
[75] Inventor: Raymond G. Reip, Clarendon Hills, Ill.
[73] Assignee: Vapor Corporation, Chicago, Ill.
[21] Appl. No.: 821,791
[22] Filed: Aug. 4, 1977
[51] Int. Cl.² .............................................. G01F 23/08
[52] U.S. Cl. ..................................... 73/321; 73/322.5
[58] Field of Search ................. 73/319, 321, 314, 313, 73/322.5, 322, 317

[56] References Cited
U.S. PATENT DOCUMENTS

| 829,103 | 8/1906 | Dixon | 73/322 |
|---|---|---|---|
| 2,747,605 | 5/1956 | Adams | 73/322.5 |
| 3,202,173 | 8/1965 | Szwargulski | 73/322.5 X |
| 3,793,884 | 2/1974 | Fling et al. | 73/314 |
| 3,855,585 | 12/1974 | Stout | 73/313 X |
| 3,935,741 | 2/1976 | Zinsmeyer et al. | 73/321 X |

Primary Examiner—Daniel M. Yasich
Attorney, Agent, or Firm—Francis J. Lidd

[57] ABSTRACT

A data acquisition device used to measure fluid level includes a float coupled to a measuring tape. The float includes a body with a first surface defining a first cross-sectional area and a second surface defining a second cross-sectional area; the second cross-sectional area being smaller than the first. A tube extends from the device to a location above the fluid level. The float is positioned within the tube in an orientation wherein the first surface is parallel to the axis of the tube. The float is then lowered to a point outside the tube and pivoted such that the first surface is transverse to the axis of the tube. The float is then lowered to the fluid surface allowing the data acquisition device to record the fluid level.

8 Claims, 2 Drawing Figures

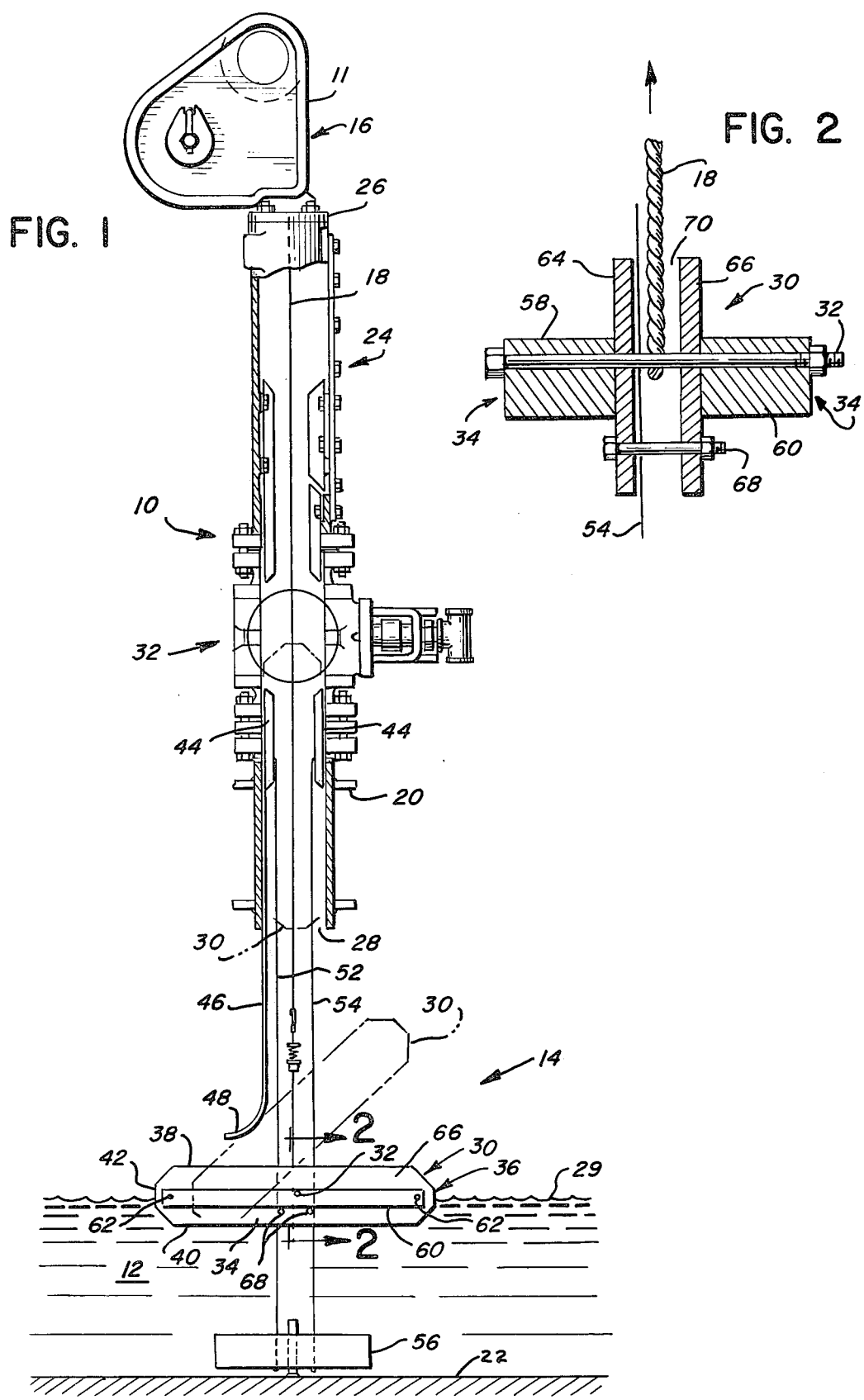

REMOVABLE TANK GAUGE FLOAT

BACKGROUND OF THE INVENTION

A. Field of the Invention

The present invention relates to a new and improved float employed with a data acquisition device to measure the fluid level in a reservoir and to a new and improved method for measuring fluid within a reservoir.

B. Description of the Prior Art

The measurement of the volume and level of fluid within a reservoir is most accurately accomplished through the use of sophisticated data acquisition devices and floats. Measurement of the distance the float travels within the reservoir from a selected point before contacting the surface of the fluid is performed and recorded by the data acquisition device.

One prior art procedure for measuring involves dropping the float with a tape attached to the float onto the fluid. The tape includes accurately punched holes. The holes in the tape are counted until the float is supported by the measured fluid, thus allowing a data acquisition device to measure the length of the tape and display the fluid volume and height.

Another prior art procedure utilizes a potentiometer whose shaft position is a function of the number of turns made by the measuring tape in unwinding from a reel as the float is lowered. Such a prior art procedure and system is disclosed in U.S. Pat. No. 3,855,585.

A substantial problem is employing floats in the above-described prior art procedures and particularly if measuring fluids particularly liquified gases within storage tanks on ocean going oil tankers, lies in replacing or repairing floats and/or measuring tapes when necessary, due to damage or malfunction. Conventional techniques involve draining the tank, and performing repairs after entering through an access port. In the case of liquified gases, the tank must be drained and warmed before entering for repairs or adjustments. It will be appreciated by those skilled in the art that these methods are cumbersome, expensive and time consuming. This relative motion of the surface of the fluid produces inaccuracies in reading as a result of friction and misalignment of the float on the guide wires that maintain the float in the desired alignment.

The conventional prior art solution to this problem is to contain the float, and measuring tape in a separate vertical tube that extends from the data acquisition device into the reservoir or tank. This tube is termed a stilling well. However, the construction of the stilling well is expensive and is subject to contamination by debris at the bottom of the tank or through communicating holes fabricated in the wall of the well. This contamination results in permanent or temporary differences between the level of fluid being measured and the actual level of fluid within the tank.

A further difficulty with a stilling well arises out of the use of a float in tanks containing liquified natural gas. Due to the low temperature of liquified natural gas and the subsequent vaporization, the float is often inaccurate. Moreover, the use of a stilling well at these low temperatures is additionally expensive.

Under these conditions and operating problems, it is highly desirable for operators of data acquisition devices to remove the float from the well and reintroduce it for periodic measurements. The float is stored in a benign environment between readings. This removal, however, is difficult due to the physical fact that the accuracy of the float is represented by an equation, that includes the cross-sectional area of the surface of the float that engages the fluid in the denominator of the equation. This physical fact necessitates a float of a relatively thin, flat construction thereby making withdrawal of the float during non-measurement periods extremely difficult. Typical prior art floats, for example, are of a disc-like configuration approximately one inch thick and often times as large as six inches in diameter.

SUMMARY OF THE INVENTION

An object of the present invention is to provide a new and improved float for measuring the volume and level of fluid within a reservoir.

Another object of the present invention is to provide a new and improved method for measuring the volume and fluid level within a reservoir.

A further object of the present invention is to provide a new and improved float that may be employed with a data acquisition device to measure volume and fluid level within a reservoir and may be removed from the reservoir at the completion of measurements.

The present invention is directed to a new and improved float that may be coupled to the measuring tape of a data acquisition device. The float includes a body that may be positioned within and removed from a reservoir or tank that is coupled to a data acquisition device and extends therefrom into a reservoir.

In order to be positioned within and removed from the tank or reservoir, the float includes a body having a first surface defining a cross-sectional area of sufficient dimension to provide accuracy in measurement upon engagement of this first surface with the fluid in the reservoir. The float also includes a second surface of a smaller cross-sectional area than the cross-sectional area of the first surface. In addition, the transverse dimension of the second surface is equal to or less than the diameter of the tubular well. As a result of the size of the second surface, the float can be positioned within the reservoir with the first surface lying in a plane parallel to the axis of a tubular guide providing access to the reservoir.

The float is then lowered within the guide and upon reaching the entrance to the tank is pivoted to a position wherein the first surface is transverse to the axis of the tubular guide well. Thereafter, the float may be further lowered until the first surface contacts the fluid within the reservoir.

After the measurement has been completed, the float may be raised to a position adjacent the lower entrance of the stilling well whereupon the float is pivoted to its first position and raised within the stilling well.

BRIEF DESCRIPTION OF THE DRAWING

The above and other objects and advantages and novel features of the present invention will become apparent from the following detailed description of a preferred embodiment of the invention illustrated in the accompanying drawing, wherein:

FIG. 1 is a view of a float, a data acquisition device and a stilling well constructed in accordance with the principles of the present invention; and FIG. 2 is a cross-sectional view of the float taken along line 2—2 of FIG. 1.

DESCRIPTION OF THE PREFERRED EMBODIMENT

With reference now to the drawing, there is illustrated a data transmission system generally designated by the reference numeral 10. The system 10 is employed to ascertain the volume and level of fluid designated by the reference numeral 12 contained within a reservoir generally designated by the reference numeral 14.

The data transmission system 10 employs a data acquisition device such as the gauge head 16. The device 16 is of the type well known in the art and generally employs a potentiometer whose shaft position is a function of the number of turns made by a measuring tape 18 as it is unwound from a reel. A data acquisition device of this type is described in greater detail in U.S. Pat. No. 3,855,585 assigned to the assignee of the present application and incorporated by reference herein.

Briefly, the gauge head 16 includes a housing 11 mounted on top of the reservoir or storage tank 14 the top 20 and bottom 22 of which are partially illustrated in FIG. 1. Extending from the gauge head 16 into the reservoir 14 is a cylindrical guide tube generally designated by the reference numeral 24. An upper end 26 of the guide 24 is coupled to the gauge head 16. The lower end or entrance 28 of the guide 24 extends into the reservoir and above the upper surface 29 of the fluid 12. To measure the level of fluid in the reservoir 14, the measuring tape 18 is coupled at its lower end to a float 30 at a fastener 32 slightly off the center of the float 30 such that the float 30 may pivot about the fastener 32.

In accordance with an important feature of the present invention, the float 30 is intended to be lowered within the tubular guide 24 when a measurement is to be made and to be removed at the completion of the measurement thereby minimizing possible damage to the float 30. Accordingly, the guide 24 includes a ball valve 32 that is of sufficient dimension to allow insertion of the float 30 into the guide 24 prior to measurement.

In order to allow the positioning of the float 30 within the guide 24 and also to provide a float 30 that includes a surface with a sufficient cross-sectional area that comes in contact with the fluid 12 to be buoyed thereby, the float 30 is of a rectangular configuration having a substantially greater length indicated by the dimension defined by the side 34 than width as defined by the end 36 of the float 30. In addition, the length of the side 34 is substantially greater than the height of the float 30 as defined by the distance between the upper surface 38 and the lower surface 40.

Consequently, the cross-sectional area of the lower surface 40 is substantially greater than the cross-sectional area of either of the ends 36 or 42 of the float 30. In this manner, the dimensions of the guide 24 can be selected such that the float 30 can be positioned within the stilling well 24 through the ball valve 32 if the side 34 of the float 30 is substantially parallel to the axis of the tubular stilling well 24. This position of the float 30 is illustrated by phantom lines in FIG. 1 at the position adjacent to the ball valve 32. This is possible, for example, if the diameter of the guide 24 is equal to or greater than the length of the ends 36 and 42.

Once the float 30 is introduced into the guide 24 in this position, it may be lowered by the unreeling or unwinding of the measuring tape 18. The movement of the float 30 within the guide 24 is guided by guide plates 44 secured to the interior of the guide tube 24. The plates 44 serve to maintain the float 30 in its first orientation wherein the side 34 remains substantially parallel to the axis of the stilling well 24.

As the float 30 is lowered through the entrance 28 of the tubular guide 24, it is not longer held by the guide plates 44 or the sides of the stilling well 24 in the first orientation. Consequently, the float 30 tends to pivot around the fastener 32 due to the asymmetrical mounting of the float on the measuring tape 18; however, the float 30 is maintained in substantially its first orientation by a cam surface or finger 46 extending down from the lower entrance 28 of the stilling well 24. The finger 46 has a radial or curved end 48 that terminates above the upper level 29 of the fluid 12. More specifically, as the float 30 is lowered below the entrance it slidingly engages the finger 46 following its curved surface.

As the float 30 is further located from the entrance 28 it slidingly engages the radial portion 48 of the finger 46, and is pivots about its asymmetrical mounting as illustrated by the phantom lines in FIG. 1 adjacent to the radial portion 48. The float 30 pivots from its first orientation to a second orientation wherein the length defined by the side 34 is substantially horizontal or transverse to the axis of the guide 24 and substantially parallel to the upper surface 29 of the fluid 12. Once in this second orientation, the float 30 may be further lowered until the cross-sectional area defined by the bottom 40 of the float 30 contacts the upper surface 29 of the fluid 12 and buoyed thereby. At this point the distance that the measuring wire 18 has travelled is measured by the device 16 and displayed as an indication of the volume of fluid 12 in the reservoir 14.

To provide rotational stability of the float 30 as it is lowered out of the guide 24, a pair of vertical wires 52 and 54 are secured at an upper end to the plates 44 and at a lower end to a guide wire tension weight 56 that is positioned on the bottom 22 of the tank 14. The wire tension weight 56 is of sufficient weight to maintain the wires 52 and 54 taut so as to provide a sufficient guide for the float 30 while it is lowered or raised relative to the upper surface 29 of the fluid 12.

Once the measurement of the fluid level has been accomplished, the float 30 may be raised from its position floating on top of the upper surface 29 of the fluid 12 to within the guide tube 24 whereupon it may be removed through the ball valve 32. The removal of the float 30 is accomplished by reeling in the measuring tape 18 upon actuating the device 16. As the float 30 is raised from the surface 29 of the fluid 12, the side 34 remains substantially parallel to the surface 50. As the float 30 engages the radial portion 48 of the finger 46, however, it is pivoted about the fastener 32 and rotated from its second orientation to its first orientation wherein the side 34 is substantially parallel to the axis of the stilling well 24. This pivoting movement is illustrated by the phantom line of the float 30 adjacent to the radial portion 48.

Subsequent raising of the float 30 causes further pivoting movement until the float 30 is pivoted to its first orientation. Further raising or reeling in of the measuring tape 18 lifts the float 30 up the tube 24 to a point adjacent the ball valve 32 whereupon the float 30 may be removed from the tube.

The float 30 is of a simple construction defined by a first 58 and a second 60 block of rigid closed cell foam or its equivalent. The blocks 58 and 60 are held together by a fastener such as the bolt 32 that extends through the blocks 58 and 60 and through a first 64 and a second 66 stainless steel plate. The stainless steel plates 64 and 66 are maintained a predetermined distance apart by a pair of bolts 65. The measuring tape 18 is secured to the bolt 32 and defines the pivot point of the float 30.

The wires 52 and 54 extend through a slot 70 defined between the stainless steel plates 64 and 66 and outside of the fasteners 68 such that the wires 52 and 54 do not bind on any portion of the float 30 during pivoting. In this manner, frictional engagement of the guide wires 52 and 54 with the float 30 that would hamper the relative vertical movement of the float 30 relative to the guide wires 52 and 54 is prevented.

While the invention has been described with reference to details of the illustrated embodiment, it should be understood that such details are not intended to limit the scope of the invention as defined in the following claims.

What is claimed and desired to be secured by Letters Patent of the United States is:

1. A method of measuring the level of fluid in a reservoir employing a data acquisition device coupled to a float by a length of wire, said float being asymmetrically mounted, said data acquisition device being in communication with the interior of said reservoir through a length of tube; the depth and width of said float being substantially less than the length of said float, said tube including an arcuate camming surface at a lower end, the steps comprising:
   pivoting said float within said tube to a first orientation wherein the length of said float is parallel to the axis of said tube and the width of said float is transverse to said axis;
   lowering said float in said tube to said lower end thereof;
   pivoting said float to a second orientation by sliding engagement of said float along said camming surface due to said asymmetrical mounting as said float is lowered wherein said length of said float in said second orientation being substantially transverse to said axis; and
   lowering said float to floating engagement with the upper surface of said fluid
   measuring the distance said float was lowered to determine the level of said fluid,
   raising said float from said fluid surface toward said lower end of said tube;
   pivoting said float to said first orientation;
   raising said float into said tube; and removing said float from said tube.

2. A float coupled to a data acquisition device for measuring the level of fluid within a reservoir, said data acquisition device in communication with said reservoir through a tube, said tube including an entrance located at a position above the surface of said fluid, said tube being of a predetermined cross-sectional area, said float comprising;
   a body including at least a first surface for interacting with said fluid to allow said body to float on said fluid; and
   at least a second surface, said second surface being of a cross-sectional area less than said predetermined cross-sectional area of said tube, said first surface being of a cross-sectional area greater than said predetermined cross-sectional area and said cross-sectional area of said second surface,
   said float being coupled to said data acquisition device in a manner biasing said body to a position wherein said first surface being transverse to an longitudinal axis of said tube, said tube includes a cam member projecting below said said entrance and mounted on said tube, said body being mounted on a measuring wire in a position to engage said cam member upon being raised from the surface of said fluid whereby said engagement with said cam member pivots said body to an orientation aligning said second surface to a position in said entrance thereby allowing said body to be raised into said tube.

3. The float claimed in claim 2 said body being coupled to said data acquisition device by said retractable measuring wire, said measuring member extending through said tube and being controlled by said data acquisition device to raise and lower said body relative to said fluid.

4. A method of measuring the level of fluid in a reservoir using a data acquisition device that includes a measuring tape lowered into said reservoir, a tube extending into said reservoir including a lower entrance located above said fluid level, an arcuate guide finger secured to and extending from said lower entrance, said measuring wire extending through said tube, and a float secured to said measuring wire in a manner tending to bias said float to a position transverse of said tube, said float including a first planar surface defining a first cross-sectional area and a second planar surface defining a second cross-sectional area, said second cross-sectional area being smaller than said first cross-sectional area, the steps of said method comprising:
   orienting said float in a first position within said tube with said first surface being parallel to an elongated axis of said tube;
   lowering said float within said tube while in said first position;
   pivoting said float to a second position at said lower entrance upon sliding engagement with said guide finger wherein said first surface being transverse to said axis;
   lowering said float in said second position to floating engagement with said fluid
   raising said float from said fluid to said lower entrance;
   pivoting said float into said first position through engagement with said finger; and
   raising said float within said tube.

5. The method claimed in claim 4 further comprising: removing said float from said tube.

6. The combination comprising a data acquisition device operable to record and display the fluid level in a reservoir; a measuring tape retractably coupled to said data acquisition device; a tubular stilling well extending from said data acquisition device to a lower location within said reservoir above said fluid, said stilling well being of a predetermined diameter and cross-sectional area, said stilling well further including a radial cam finger extending from said lower location; and
   a float coupled to said measuring tape;
   said float including a body, said body including a pair of identical first sides, a pair of identical second sides and a pair of identical third sides, each said second and third sides being of a length less than said predetermined diameter, each said first side being of a length greater than said predetermined diameter;
   a pair of opposing first surfaces defined by said first and second sides, and a pair of opposing second surfaces defined by said second and third sides, each said second surface being of a smaller cross-sectional area than said predetermined cross-sectional area of said stilling well, each said first surface being of a cross-sectional area larger than said predetermined cross-sectional area and said cross-sectional area of each said second surface such that said float may be positioned in said stilling well with said first surfaces being parallel to the axis of said stilling well and lowered in said stilling well and being pivoted to a position transverse to said stilling well by sliding engagement with said cam finger.

7. The combination claimed in claim 6 wherein said body includes a slot, and at least one guide wire coupled to said stilling well and said reservoir at a location below said guide tube, said guide wire extending through said slot.

8. The combination claimed in claim 6, wherein said guide tube includes a ball valve to allow the introduction of said float into said guide tube.

* * * * *

UNITED STATES PATENT OFFICE
CERTIFICATE OF CORRECTION

Patent No. 4,116,062          Dated September 26, 1978

Inventor(s) Raymond G. Reip

It is certified that error appears in the above-identified patent and that said Letters Patent are hereby corrected as shown below:

Column 4, line 16, "located" should read --- lowered ---.

Signed and Sealed this

Twenty-seventh Day of March 1979

[SEAL]

Attest:

RUTH C. MASON
Attesting Officer

DONALD W. BANNER
Commissioner of Patents and Trademarks

UNITED STATES PATENT OFFICE
CERTIFICATE OF CORRECTION

PATENT NO. : 4,116,062
DATED : 9-26-78
INVENTOR(S) : Raymond G. Reip

It is certified that error appears in the above-identified patent and that said Letters Patent are hereby corrected as shown below:

Col. 1, line 32, change "is" to -- in --;

Col. 4, line 18, remove "is";

Col. 6, line 12, change "member" to -- wire --.

Signed and Sealed this

Fifteenth Day of May 1979

[SEAL]

Attest:

RUTH C. MASON
Attesting Officer

DONALD W. BANNER
Commissioner of Patents and Trademarks